US012313781B2

(12) United States Patent
Robertson, Jr. et al.

(10) Patent No.: US 12,313,781 B2
(45) Date of Patent: May 27, 2025

(54) SENSOR ASSEMBLY WITH FLUID MANAGEMENT SEAL

(71) Applicant: Ford Global Technologies, LLC, Dearborn, MI (US)

(72) Inventors: Michael Robertson, Jr., Garden City, MI (US); Venkatesh Krishnan, Canton, MI (US); Rashaun Phinisee, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 18/066,561

(22) Filed: Dec. 15, 2022

(65) Prior Publication Data

US 2024/0201332 A1 Jun. 20, 2024

(51) Int. Cl.
*G01S 7/48* (2006.01)
*G01S 7/02* (2006.01)
(Continued)

(52) U.S. Cl.
CPC ............. *G01S 7/4813* (2013.01); *G01S 7/027* (2021.05); *G01S 2013/93273* (2020.01); *G01S 17/931* (2020.01); *H04N 23/51* (2023.01)

(58) Field of Classification Search
CPC . G01L 19/147; G01L 9/0072; G01L 19/0645; G01L 19/0084; G01L 13/025; G01L 19/0007; G01L 19/0038; G01L 9/0042; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082;
(Continued)

(56) References Cited

U.S. PATENT DOCUMENTS

| 10,561,044 | B2 | 2/2020 | Schmidt |
| 10,578,716 | B1 | 3/2020 | Hu et al. |
| 11,247,616 | B2 * | 2/2022 | Boswell .................. B60R 11/04 |
| 11,408,984 | B2 | 8/2022 | Phinisee et al. |
| 2018/0220555 | A1 * | 8/2018 | Schmidt ............. H05K 7/20872 |
| 2020/0238955 | A1 | 7/2020 | Walsoe et al. |
| 2021/0025982 | A1 | 1/2021 | Robertson, Jr. et al. |

(Continued)

FOREIGN PATENT DOCUMENTS

| CN | 109835306 A | 6/2019 |
| CN | 114269603 A | 4/2022 |

(Continued)

*Primary Examiner* — Andre J Allen
(74) *Attorney, Agent, or Firm* — Frank A. MacKenzie; Brooks Kushman P.C.

(57) ABSTRACT

A sensor assembly includes a base, a sensor mounted to the base, a housing mounted to the base, and a seal extending around the base. The seal is compressed between the base and the housing. The seal includes a notch sized to permit fluid to exit from a space enclosed by the base and the housing.

20 Claims, 7 Drawing Sheets

(51) Int. Cl.
*G01S 7/481* (2006.01)
*G01S 13/931* (2020.01)
*G01S 17/931* (2020.01)
*H04N 23/51* (2023.01)

(58) Field of Classification Search
CPC ............... G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 11/008; G01L 13/026; G01L 7/22; G01L 13/00; G01L 9/0047; G01L 9/0076; G01L 7/08; G01L 9/0025; G01L 9/0035; G01L 9/0005; G01L 9/0041; G01L 19/0061; G01L 21/00; G01L 9/0019; G01L 9/10; G01L 9/08; G01L 11/006; G01L 9/04; G01L 19/086; G01L 9/0008; G01L 1/18; G01L 11/004; G01L 19/069; G01L 9/00; G01L 9/0057; G01L 19/083; G01L 19/10; G01L 19/16; G01L 19/06; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 23/16; G01L 7/088; G01L 7/163; G01L 9/0007; G01L 13/06; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 7/06; G01L 1/2206; G01L 5/228; G01L 7/102; G01L 13/021; G01L 27/02; G01L 1/2262; G01L 1/24; G01L 1/26; G01L 19/144; G01L 23/00; G01L 9/0094; G01L 9/0082; G01L 1/125; G01L 9/0097; G01L 1/146; G01L 1/2268; G01L 11/06; G01L 21/30; G01L 21/34; G01L 23/221; G01L 7/187; G01L 7/20; G01L 23/26; G01L 7/068; G01L 1/144; G01L 1/225; G01L 23/32; G01L 7/14; G01L 1/165; G01L 23/12; G01L 1/241; G01L 13/04; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/04; G01L 1/242; G01L 21/24; G01L 3/10; G01L 5/0004; G01L 5/0052; G01L 7/10; G01L 1/00; G01L 1/103; G01L 1/2275; G01L 1/247; G01L 21/02; G01L 21/26; G01L 23/225; G01L 3/102; G01L 3/105; G01L 5/223; G01L 5/24; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/166; G01L 7/185; G01L 1/255; G01L 21/08; G01L 5/0057; G01L 5/1627; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; H01L 2924/00014; H01L 2224/48091; H01L 2924/00; H01L 2224/73265; H01L 2224/48247; H01L 2224/48137; H01L 29/84; H01L 2924/00012; H01L 2924/181; H01L 2224/45144; H01L 2924/10253; H01L 2224/48227; H01L 2224/8592; H01L 2224/49171; H01L 2924/0002; H01L 2224/48465; H01L 2924/1815; H01L 2924/3025; H01L 2924/1461; H01L 2224/32225; H01L 2924/15151; H01L 2924/01079; H01L 2224/48472; H01L 24/48; H01L 2224/05554; H01L 24/45; H01L 2924/14; H01L 2224/45124; H01L 2924/16152; H01L 21/67253; H01L 2924/01013; H01L 2224/49175; H01L 2924/01006; H01L 2924/16151; H01L 2924/01033; H01L 2924/01078; H01L 2924/01082; H01L 2924/01322; H01L 2224/32245; H01L 2924/10155; H01L 2224/16225; H01L 2924/01005; H01L 2924/13091; H01L 2224/45099; H01L 24/32; H01L 2924/014; H01L 2924/16195; H01L 2224/48464; H01L 24/49; H01L 2924/1305; H01L 2924/3011; H01L 2224/05553; H01L 23/057; H01L 2924/15153; H01L 2924/19107; H01L 2224/05644; H01L 2924/01014; H01L 2924/01047; H01L 2924/09701; H01L 24/05; H01L 24/73; H01L 29/66007;
H01L 2924/01046; H01L 2924/10158;
H01L 2924/1433; H01L 2924/15311;
H01L 2924/01023; H01L 2924/01029;
H01L 2924/01074; H01L 2924/15165;
H01L 2924/19105; H01L 21/00; H01L
2224/02166; H01L 2224/04042; H01L
2224/05599; H01L 2224/73257; H01L
23/24; H01L 23/49575; H01L 24/24;
H01L 24/80; H01L 24/82; H01L 25/16;
H01L 2924/30105; H01L 2924/351;
H01L 21/2007; H01L 21/6835; H01L
2224/04105; H01L 2224/05568; H01L
2224/05573; H01L 2224/16227; H01L
2224/24137; H01L 2224/48699; H01L
2224/48744; H01L 2224/73204; H01L
24/19; H01L 2924/01024; H01L
2924/01027; H01L 2924/12042; H01L
2924/15156; H01L 2924/15747; H01L
2924/15787; H01L 2924/19042; H01L
21/568; H01L 22/12; H01L 2224/05001;
H01L 2224/45015; H01L 2224/81801;
H01L 2224/8385; H01L 23/5389; H01L
24/83; H01L 27/00; H01L 2924/01004;
H01L 2924/07811; H01L 2924/207; H01L
21/30608; H01L 21/3065; H01L
21/31111; H01L 21/76897; H01L 22/34;
H01L 2224/05124; H01L 2224/16235;
H01L 2224/16245; H01L 2224/32145;
H01L 2224/45147; H01L 2224/45169;
H01L 2224/48644; H01L 2224/81805;
H01L 2224/83805; H01L 23/16; H01L
23/291; H01L 23/3121; H01L 23/49503;
H01L 24/06; H01L 24/85; H01L 25/0652;
H01L 28/20; H01L 29/00; H01L
2924/01015; H01L 2924/01028; H01L
2924/01039; H01L 2924/0105; H01L
2924/01057; H01L 2924/01058; H01L
2924/0106; H01L 2924/01068; H01L
2924/01072; H01L 2924/01073; H01L
2924/12032; H01L 2924/12044; H01L
2924/15192; H01L 2924/19041; H01L
21/67132; H01L 2224/05624; H01L
2224/05647; H01L 2224/08245; H01L
2224/12105; H01L 2224/13; H01L
2224/2612; H01L 2224/26175; H01L
2224/48145; H01L 2224/48147; H01L
2224/48195; H01L 2224/80805; H01L
2224/80893; H01L 2224/80894; H01L
2224/83385; H01L 2224/8389; H01L
2224/92247; H01L 23/04; H01L 23/053;
H01L 23/49811; H01L 23/49877; H01L
23/66; H01L 24/03; H01L 24/08; H01L
24/18; H01L 24/96; H01L 25/167; H01L
27/0688; H01L 2924/00015; H01L
2924/01012; H01L 2924/01067; H01L
2924/01077; H01L 2924/16235; H01L
2924/18162; H01L 31/0203; H01L
21/02126; H01L 21/02203; H01L
21/02216; H01L 21/02274; H01L
21/0273; H01L 21/0334; H01L 21/3105;
H01L 21/311; H01L 21/32053; H01L
21/324; H01L 21/4842; H01L 21/561;
H01L 21/67017; H01L 21/67069; H01L
21/67201; H01L 21/67276; H01L
21/6838; H01L 21/76; H01L 21/76297;
H01L 21/764; H01L 21/7682; H01L
21/78; H01L 22/10; H01L 22/32; H01L
2221/00; H01L 2221/68359; H01L
2221/68363; H01L 2224/023; H01L
2224/02379; H01L 2224/05073; H01L
2224/05155; H01L 2224/05166; H01L
2224/05558; H01L 2224/0558; H01L
2224/056; H01L 2224/05669; H01L
2224/16145; H01L 2224/24011; H01L
2224/24051; H01L 2224/24226; H01L
2224/24227; H01L 2224/24998; H01L
2224/2518; H01L 2224/29099; H01L
2224/45014; H01L 2224/451; H01L
2224/4813; H01L 2224/48225; H01L
2224/48257; H01L 2224/48455; H01L
2224/48463; H01L 2224/48475; H01L
2224/48599; H01L 2224/48624; H01L
2224/48647; H01L 2224/48724; H01L
2224/48747; H01L 2224/48799; H01L
2224/48844; H01L 2224/49; H01L
2224/4905; H01L 2224/49109; H01L
2224/49113; H01L 2224/49173; H01L
2224/72; H01L 2224/3267; H01L
2224/76155; H01L 2224/78313; H01L
2224/78318; H01L 2224/82007; H01L
2224/82102; H01L 2224/82103; H01L
2224/8319; H01L 2224/85051; H01L
2224/85148; H01L 2224/85203; H01L
2224/85206; H01L 2224/85444; H01L
2224/85909; H01L 23/051; H01L 23/08;
H01L 23/10; H01L 23/15; H01L 23/29;
H01L 23/293; H01L 23/315; H01L
23/467; H01L 23/4821; H01L 23/4951;
H01L 23/49513; H01L 23/49541; H01L
23/49548; H01L 23/49805; H01L 23/562;
H01L 23/576; H01L 24/10; H01L 24/26;
H01L 24/76; H01L 24/78; H01L 24/81;
H01L 25/03; H01L 25/041; H01L 25/50;
H01L 27/0248; H01L 27/0629; H01L
27/14653; H01L 27/14685; H01L 28/40;
H01L 29/0657; H01L 29/66; H01L
29/7804; H01L 2924/0001; H01L
2924/00013; H01L 2924/01007; H01L
2924/0101; H01L 2924/01019; H01L
2924/01026; H01L 2924/01038; H01L
2924/0104; H01L 2924/01041; H01L
2924/01042; H01L 2924/01051; H01L
2924/01076; H01L 2924/0133; H01L
2924/04642; H01L 2924/04941; H01L
2924/05042; H01L 2924/07802; H01L
2924/10161; H01L 2924/12036; H01L
2924/1301; H01L 2924/13062; H01L
2924/15174; H01L 2924/1531; H01L
2924/15788; H01L 2924/163; H01L
2924/19043; H01L 2924/206; H01L
2924/30107; H01L 31/00; H01L 33/0025;
H01L 21/02107; H01L 21/02282; H01L
21/314; H01L 21/56; H01L 21/67; H01L
21/67051; H01L 21/823828; H01L
21/823864; H01L 22/00; H01L
2224/0603; H01L 2224/131; H01L
2224/16; H01L 2224/18; H01L
2224/2919; H01L 2224/29191; H01L
2224/48106; H01L 2224/4847; H01L 2224/49105; H01L 2224/82951; H01L
2224/85399; H01L 2225/1023; H01L
2225/1058; H01L 23/047; H01L 23/3128;
H01L 23/481; H01L 23/4952; H01L
23/49558; H01L 23/49861; H01L
23/5226; H01L 23/552; H01L 23/564;
H01L 23/62; H01L 24/09; H01L 24/13;
H01L 24/16; H01L 24/29; H01L 25/105;
H01L 25/165; H01L 29/0669; H01L
29/0673; H01L 29/786; H01L 2924/0665;
H01L 2924/10329; H01L 2924/152;
H01L 2924/15331; H01L 2924/1627;
H01L 31/02327; H01L 31/16

See application file for complete search history.

(56) References Cited

U.S. PATENT DOCUMENTS

| | | | | |
|---|---|---|---|---|
| 2021/0063210 A1* | 3/2021 | Krishnan | ............... | G01D 11/26 |
| 2021/0132193 A1* | 5/2021 | Ratner | ................ | G01S 7/4813 |
| 2021/0223070 A1 | 7/2021 | Hu et al. | | |
| 2022/0234547 A1 | 7/2022 | Lee | | |
| 2024/0010209 A1* | 1/2024 | Han | ...................... | B60W 50/06 |
| 2024/0270178 A1* | 8/2024 | Robertson, Jr. | ......... | B60R 11/00 |

FOREIGN PATENT DOCUMENTS

| | | | |
|---|---|---|---|
| CN | 217099847 U | | 8/2022 |
| JP | 2008542697 A | * | 11/2008 |

* cited by examiner

SENSOR ASSEMBLY WITH FLUID MANAGEMENT SEAL

BACKGROUND

Autonomous and semi-autonomous vehicles typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

BRIEF SUMMARY

A sensor assembly includes a base, a sensor mounted to the base, a housing mounted to the base, and a seal extending around the base. The seal is compressed between the base and the housing. The seal includes a notch sized to permit fluid to exit from a space enclosed by the base and the housing.

In an example, the notch may be a gap in the seal.

In an example, the sensor assembly may further include a vehicle body panel to which the base is mounted. In a further example, the seal may be compressed between the base and the vehicle body panel.

In another further example, the housing may include a housing peripheral edge, the housing peripheral edge may be positioned to define a gap between the housing peripheral edge and the vehicle body panel, and the gap may extend around the housing.

In an example, the base may include a base peripheral edge, and the seal may cover the base peripheral edge. In a further example, the notch may be located at a locally lowest point of the base peripheral edge.

In another further example, the seal may be shaped to attach to the base peripheral edge with a snap fit.

In an example, the housing may include a housing peripheral edge, and the seal may contact the housing inside of the housing peripheral edge and spaced from the housing peripheral edge.

In an example, the seal may have a uniform cross-sectional shape projected along a path around the base.

In an example, the housing may be arranged to conceal the seal.

In an example, the base may include a mounting platform to which the sensor is mounted, and the base may be shaped to direct gravity-induced fluid flow from the mounting platform to the notch. In a further example, the base may include a gutter extending around the mounting platform and a channel extending downward from the gutter.

In another further example, the base may include a depression positioned below the mounting platform, the depression may include a drain hole at a lowest point of the depression, and the drain hole may be positioned to direct gravity-induced fluid flow from the depression to the notch.

In a yet further example, the sensor assembly may further include a hose elongated from the drain hole to a base peripheral edge of the base.

In another further example, the mounting platform may be at a highest point of the base.

In another further example, the sensor may extend upward through a port of the housing.

In an example, the seal may include a plurality of notches including the notch, and the notches may be sized to permit fluid to exit from the space enclosed by the base and the housing.

In an example, the sensor may be positioned in the space between the base and the housing.

In an example, the sensor may be an optical sensor.

DETAILED DESCRIPTION

Figure 1:
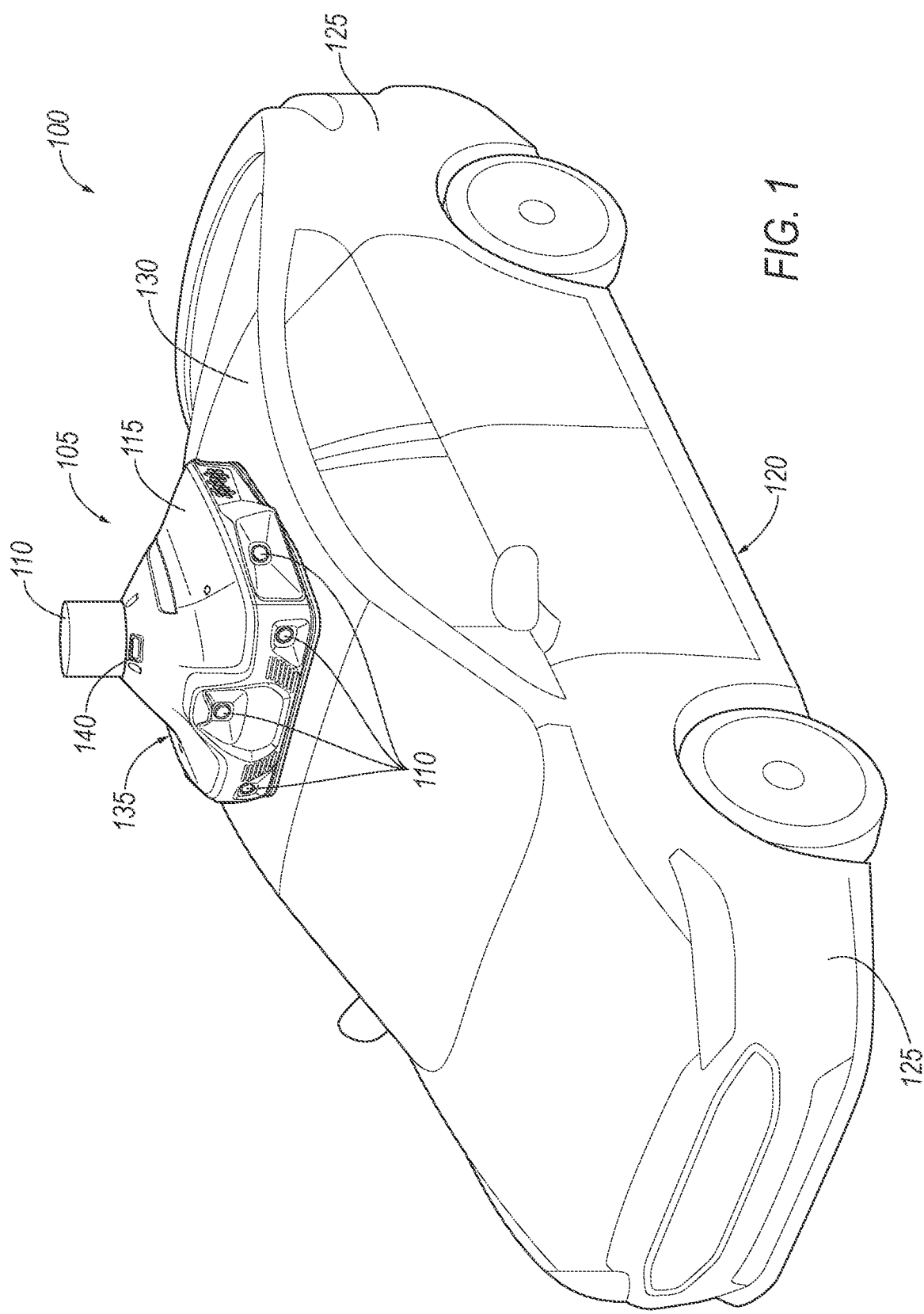
FIG. 1 is a perspective view of an example vehicle with a sensor assembly.

With reference to the Figures, wherein like numerals indicate like parts throughout the several views, a sensor assembly 105 of a vehicle 100 includes a base 205, a sensor 110 mounted to the base 205, a housing 115 mounted to the base 205, and a seal 210 extending around the base 205. The seal 210 is compressed between the base 205 and the housing 115. The seal 210 includes a notch 605 sized to permit fluid to exit from a space 215 enclosed by the base 205 and the housing 115.

As the vehicle 100 travels through the environment, fluid may enter the sensor assembly 105, e.g., rain, washer fluid used on the sensors 110, etc. The sensor assembly 105 provides a way for the fluid to exit the sensor assembly 105 through the notch 605 in the seal 210. For example, the notch 605 may be located at a low point of the base 205 so that the fluid drains to the notch 605. The seal 210 may also prevent dirt and debris and fluid from entering the sensor assembly 105 because the notch 605 occupies a small portion of the seal 210. Thus, the connection between the base 205 and the housing 115 is almost entirely sealed.

With reference to FIG. 1, the vehicle 100 may be any passenger or commercial automobile such as a car, a truck, a sport utility vehicle, a crossover, a van, a minivan, a taxi, a bus, etc.

The vehicle 100 includes a body 120. The vehicle 100 may be of a unibody construction, in which a frame and the body 120 of the vehicle 100 are a single component. The vehicle 100 may, alternatively, be of a body-on-frame construction, in which the frame supports the body 120 that is a separate component from the frame. The frame and body 120 may be formed of any suitable material, for example, steel, aluminum, etc.

The body 120 includes vehicle body panels 125 partially defining an exterior of the vehicle 100. The vehicle body panels 125 may present a class-A surface, e.g., a finished surface exposed to view by a customer and free of unaesthetic blemishes and defects. The vehicle body panels 125 include, e.g., a roof 130, etc.

The sensor assembly 105 includes a housing assembly 135 for the sensors 110. The housing assembly 135 is attachable to the vehicle 100, e.g., to one of the vehicle body panels 125 of the vehicle 100, e.g., the roof 130. For example, the housing assembly 135 may be shaped to be attachable to the roof 130, e.g., may have a shape matching a contour of the roof 130. The housing assembly 135 may be attached to the roof 130, which can provide the sensors 110 with an unobstructed field of view of an area around the vehicle 100. The housing assembly 135 may be formed of, e.g., plastic or metal.

The sensor assembly 105 includes a plurality of the sensors 110. The sensors 110 may provide data about operation of the vehicle 100, for example, wheel speed, wheel orientation, and engine and transmission data (e.g., temperature, fuel consumption, etc.). The sensors 110 may detect the location and/or orientation of the vehicle 100. For example, the sensors 110 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 110 may detect the external world, e.g., objects and/or characteristics of surroundings of the vehicle 100, such as other vehicles, road lane markings, traffic lights and/or signs, pedestrians, etc. For example, the sensors 110 may include optical sensors such as radar sensors, scanning laser range finders, light detection and ranging (lidar) devices, and image processing sensors such as cameras.

Figure 2:
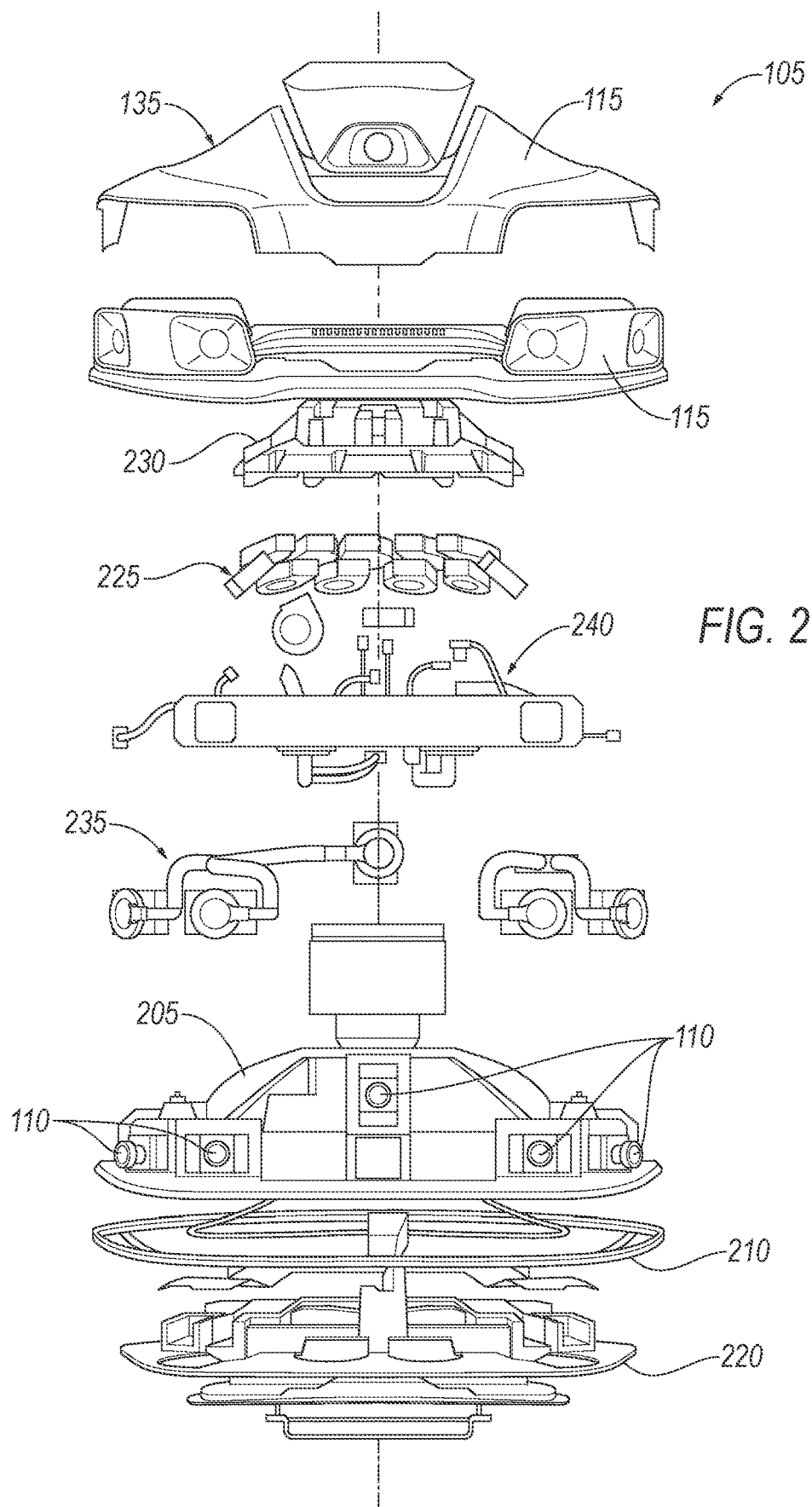
FIG. 2 is an exploded view of the sensor assembly.

With reference to FIG. 2, the housing assembly 135 includes the housing 115 and the base 205. The housing 115 and the base 205 are shaped to fit together, with the housing 115 fitting on top of the base 205. The base 205 is mounted to one of the vehicle body panels 125, e.g., the roof 130, and the housing 115 is mounted to the base 205. The housing 115 covers the base 205, e.g., conceals the base 205. The housing 115 is fixed to the base 205. The housing 115 includes a port 140 oriented horizontally at a top of the housing 115 (shown in FIG. 1). The port 140 is round, e.g., has a circular or slightly elliptical shape, sized for one of the sensors 110, e.g., a lidar sensor, to fit through. The base 205 may be integral, i.e., made of a single, uniform piece of material with no seams, joints, fasteners, or adhesives holding it together.

The sensor assembly 105 includes a plurality of components assisting the operation of the sensors 110. For example, the sensor assembly 105 may include a bracket 220 for attaching the base 205 to the roof 130 (also shown in FIG. 6). The sensor assembly 105 may include a plurality of blowers 225, an air baffle 230, and an air-distribution system 235. The blowers 225 are positioned to supply airflow to the air baffle 230 and the air-distribution system 235. The air baffle 230 may be shaped to direct airflow from the blowers 225 to the sensor 110 extending through the port 140. The air-distribution system 235 may include ducts and nozzles shaped to direct airflow to the sensors 110, e.g., the cameras, positioned between the base 205 and the housing 115. The sensor assembly 105 may include a wire harness 240 positioned to supply electricity to the sensors 110 and the blowers 225.

The housing assembly 135 may enclose and define the space 215; e.g., the base 205 and the housing 115 may enclose and define the space 215 therebetween. The housing assembly 135, e.g., the base 205 and the housing 115, may fully enclose the space 215. The space 215 may contain the sensors 110, the blowers 225, the air baffle 230, the air-distribution system 235, and/or the wire harness 240. The housing assembly 135, e.g., the housing 115, may shield contents of the space 215 from external elements such as wind, rain, debris, etc.

At least some of the sensors 110 may be disposed in the housing assembly 135, e.g., positioned in the space 215 between the base 205 and the housing 115. The sensors 110 are mounted to the base 205, and the base 205 supports the sensors 110. For example, the sensors 110 may include multiple cameras supported by the base 205 and disposed in the space 215 and at least one lidar device supported by the base 205 and extending upward through the port 140 of the housing 115.

Figure 3:
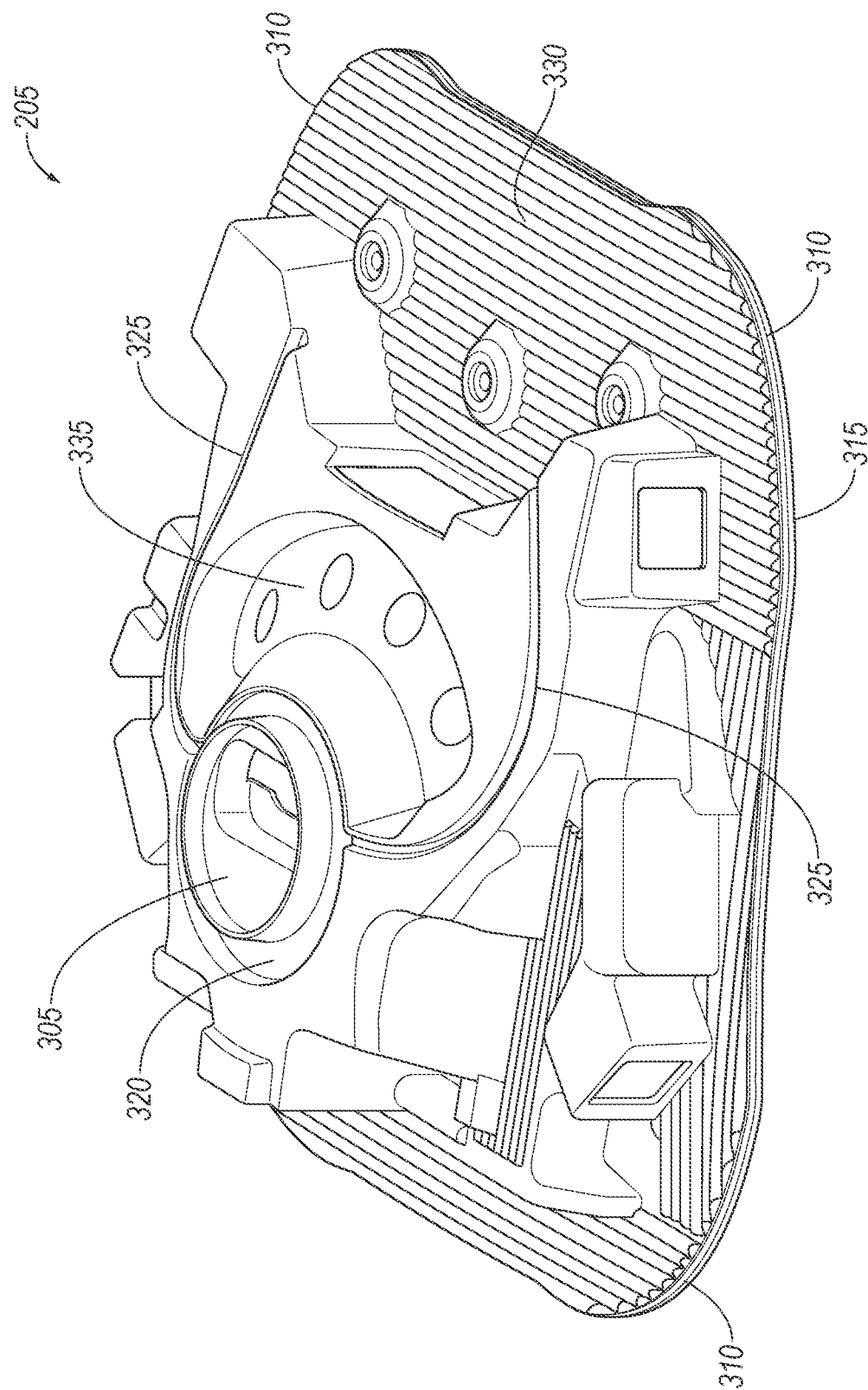
FIG. 3 is a perspective view of a base of the sensor assembly.

With reference to FIG. 3, the base 205 is shaped to direct gravity-induced fluid flow from a highest point of the base 205, e.g., a mounting platform 305 for one of the sensors 110, to one or more locally lowest points 310. A locally lowest point 310 of the base 205 is a point on the base 205 that is lower than all points on the base 205 adjacent to that point. The base 205 may be shaped such that a drop of water placed on any point of the base 205 is able to flow downward continuously to one of the locally lowest points 310, i.e., follow a gradient descent defined by the shape of the base 205 to one of the locally lowest points 310. The base 205 may include features to collect fluid together to flow toward one of the locally lowest points 310, as described below. The base 205 includes a base peripheral edge 315, which is a lateral outer boundary of the base 205, i.e., circumscribes a footprint of the base 205. The locally lowest points 310 may be located on the base peripheral edge 315, thereby permitting fluid that has flowed to the locally lowest point 310 to exit the base 205.

The base 205 may include the mounting platform 305 for directly or indirectly mounting one of the sensors 110. The mounting platform 305 may have a shape matching a bottom surface of the sensor 110, e.g., the mounting platform 305 may be round, e.g., may have a circular or slightly elliptical shape. The mounting platform 305 can be flat and horizontally level. The mounting platform 305 may be located at the highest point of the base 205.

The base 205 may include a gutter 320. The gutter 320 extends circumferentially around the mounting platform 305, e.g., is elongated circumferentially 3600 around the mounting platform 305. The gutter 320 may circumscribe the mounting platform 305. For example, the gutter 320 may have a u- or v-shaped cross-section that follows an outer edge of the mounting platform 305, i.e., that is projected along a circular path following the outer edge of the mounting platform 305. The position and shape of the gutter 320 helps the gutter 320 catch fluid, e.g., rain or washer fluid, draining from an outside surface of the sensor 110 mounted to the mounting platform 305.

Figure 4:
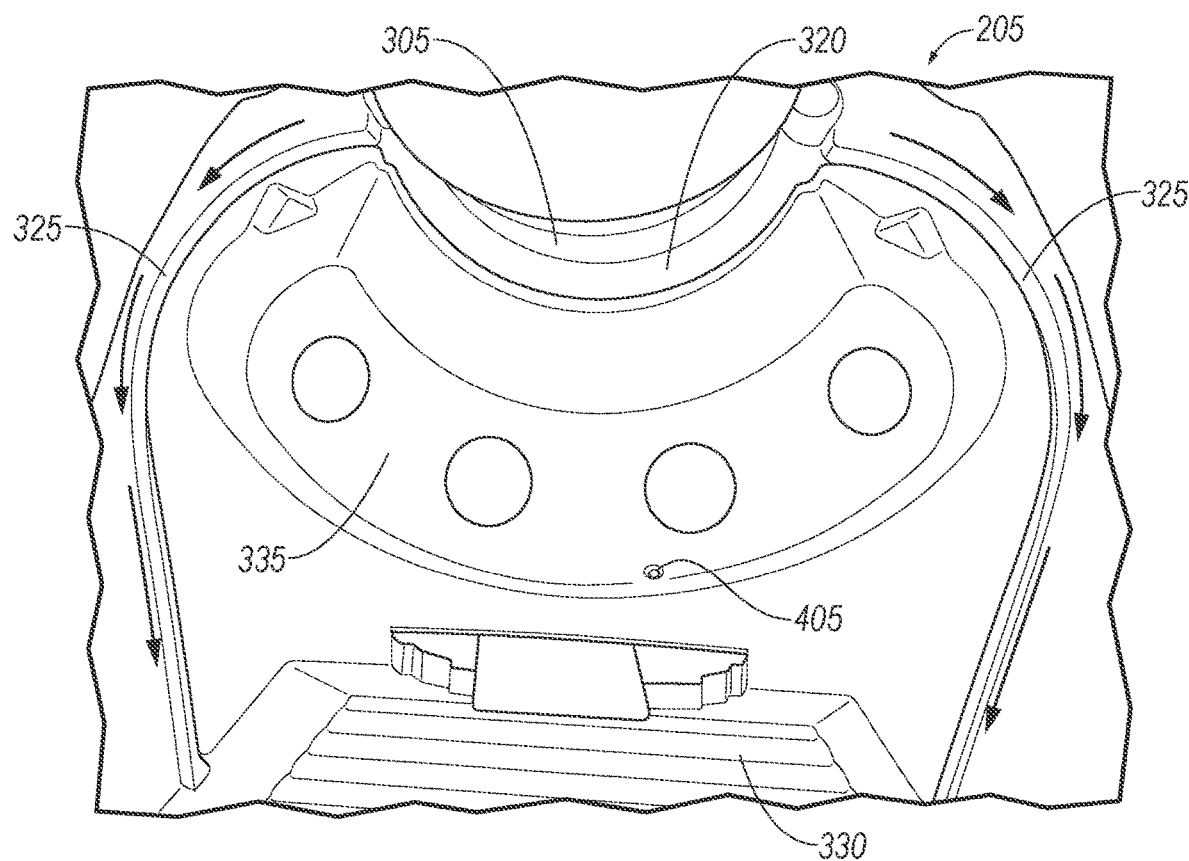
FIG. 4 is a top view of a portion of the base.

With reference to FIGS. 3 and 4, the base 205 may include one or more channels 325 extending downward from the gutter 320. Each channel 325, i.e., an upper end of the channel 325, may extend radially outward relative to the mounting platform 305 from the gutter 320. Each channel 325 may be lower than an upper height of the gutter 320, i.e., lower than a top of a radially outer wall of the gutter 320. Each channel 325 may be elongated from the upper end to a lower end emptying onto a bottom panel 330 of the base 205. Each channel 325 may be shaped to guide fluid received from the gutter 320 around components mounted to the base 205 above the bottom panel 330, e.g., the blowers 225.

The base 205 may include a depression 335 positioned below the mounting platform 305. The depression 335 may be shaped to accept one or more of the blowers 225. The depression 335 may be located above the bottom panel 330 to position the blowers 225 near the port 140. The depression 335 may extend partially around the mounting platform 305. The depression 335 may be positioned between the channels 325 while being separated from the channels 325.

With reference to FIG. 4, the depression 335 may include a drain hole 405 at a lowest point of the depression 335. The drain hole 405 may extend through a thickness of the depression 335, e.g., from a top side of the depression 335 to an underside of the depression 335. The drain hole 405 may extend downward and/or radially outward relative to the mounting platform 305. Fluid that enters the depression 335, e.g., by spilling over a top of the gutter 320, may flow downward to the drain hole 405. The drain hole 405 may be positioned to direct gravity-induced fluid flow from the depression 335 to the notch 605, e.g., via a hose 505.

Figure 5:
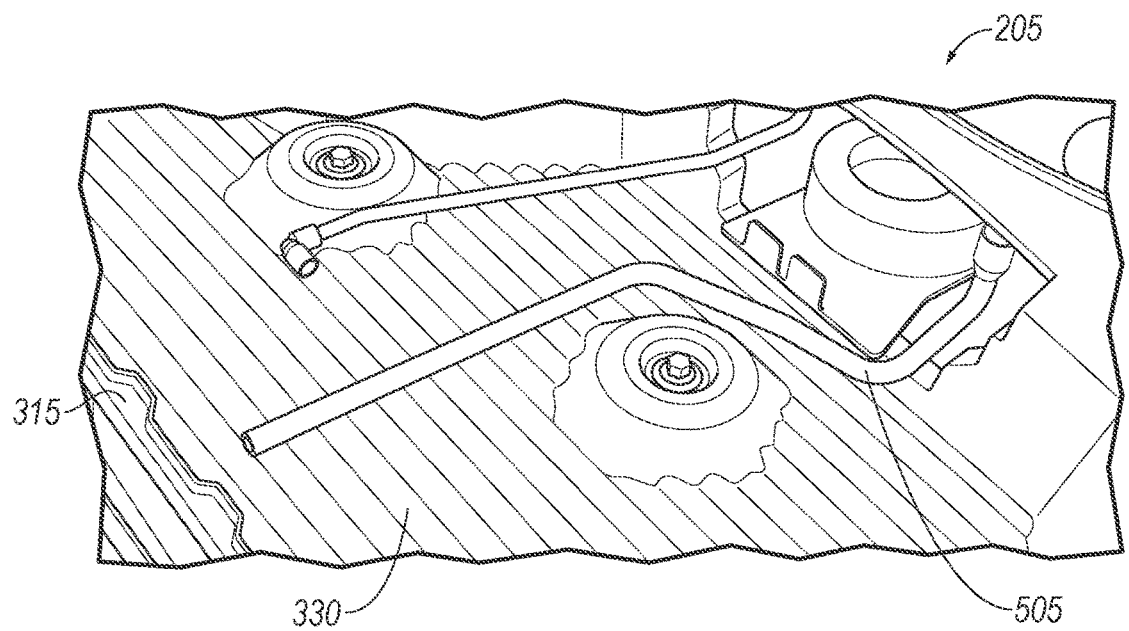
FIG. 5 is a perspective view of a portion of the base.

With reference to FIG. 5, the sensor assembly 105 may include the hose 505. The hose 505 may be elongated from the drain hole 405 to the bottom panel 330, e.g., to the base peripheral edge 315 of the base 205. The hose 505 may be, e.g., a flexible tube.

Figure 6:
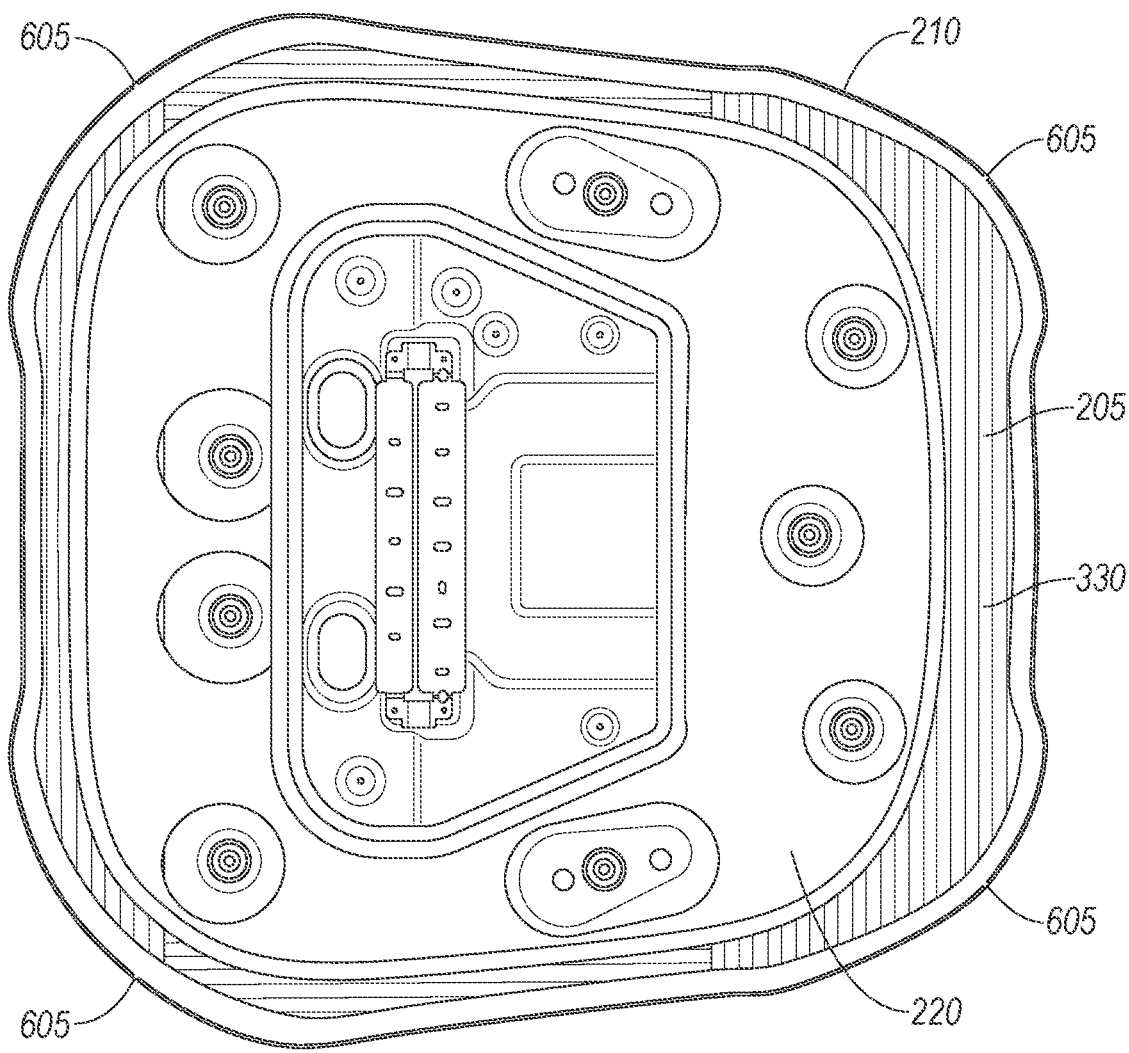
FIG. 6 is a bottom view of the sensor assembly.

With reference to FIG. 6, the seal 210 extends around the base 205. The seal 210 may follow the base peripheral edge 315 completely around the base 205, except for the notches 605. The seal 210 may have a uniform cross-sectional shape (shown below in FIG. 8) that is projected along a path around the base 205, e.g., a path following the base peripheral edge 315.

The notches 605 are located at the locally lowest points 310 of the base 205, which may be on the base peripheral edge 315. The locally lowest points 310 of the base peripheral edge 315 may correspond to the lowest points of the portion of the roof 130 covered by the sensor assembly 105. For example, the footprint of the sensor assembly 105 may be roughly quadrilateral, and the locally lowest points 310 of the base peripheral edge 315 may be the four points of the base 205 closest to the respective corners of the roof 130.

Figure 7:
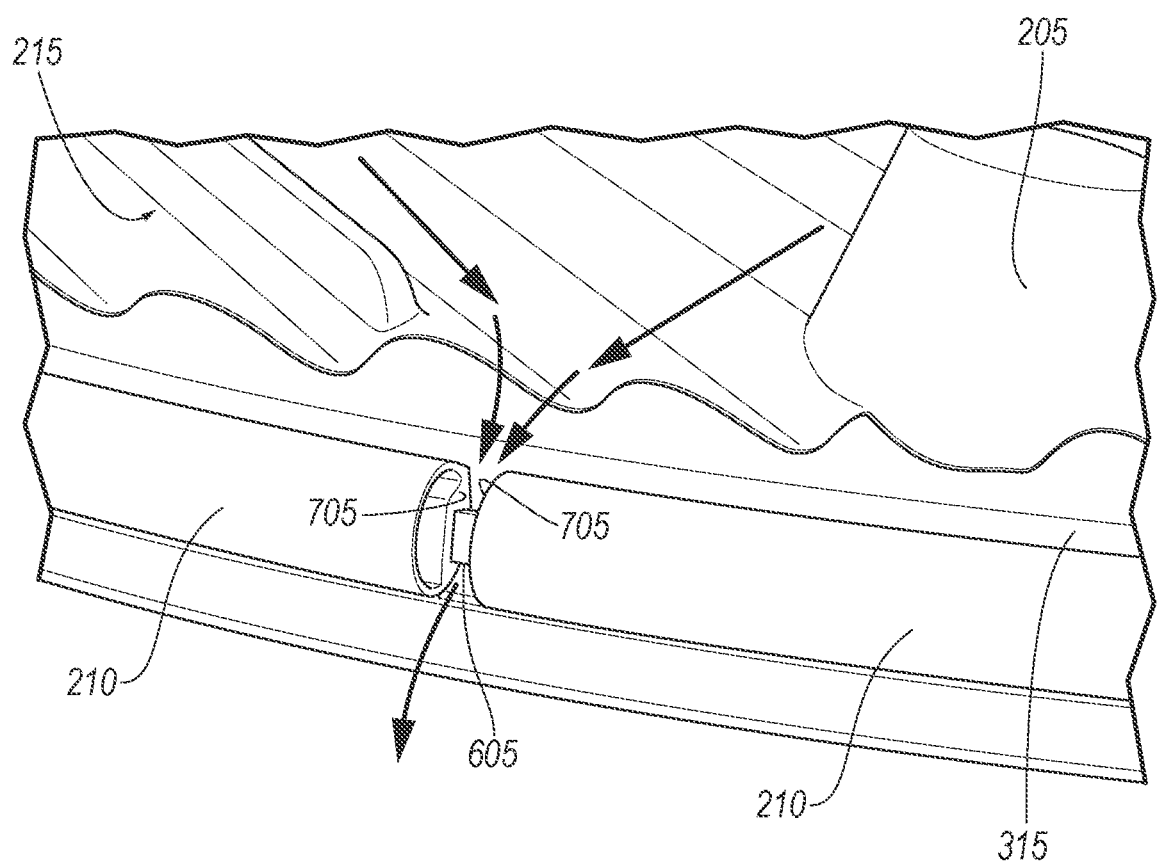
FIG. 7 is a perspective view of a portion of the base and the seal.

With reference to FIG. 7, each notch 605 is sized to permit fluid to exit from the space 215 enclosed by the base 205 and the housing 115, i.e., to flow through the notch 605. For example, each notch 605 may be a gap in the seal 210. The cross-section of the seal 210 projected along the base peripheral edge 315 may stop at a terminus 705 and then restart at another terminus 705, and the notch 605 may be defined by the two adjacent terminuses 705.

Figure 8:
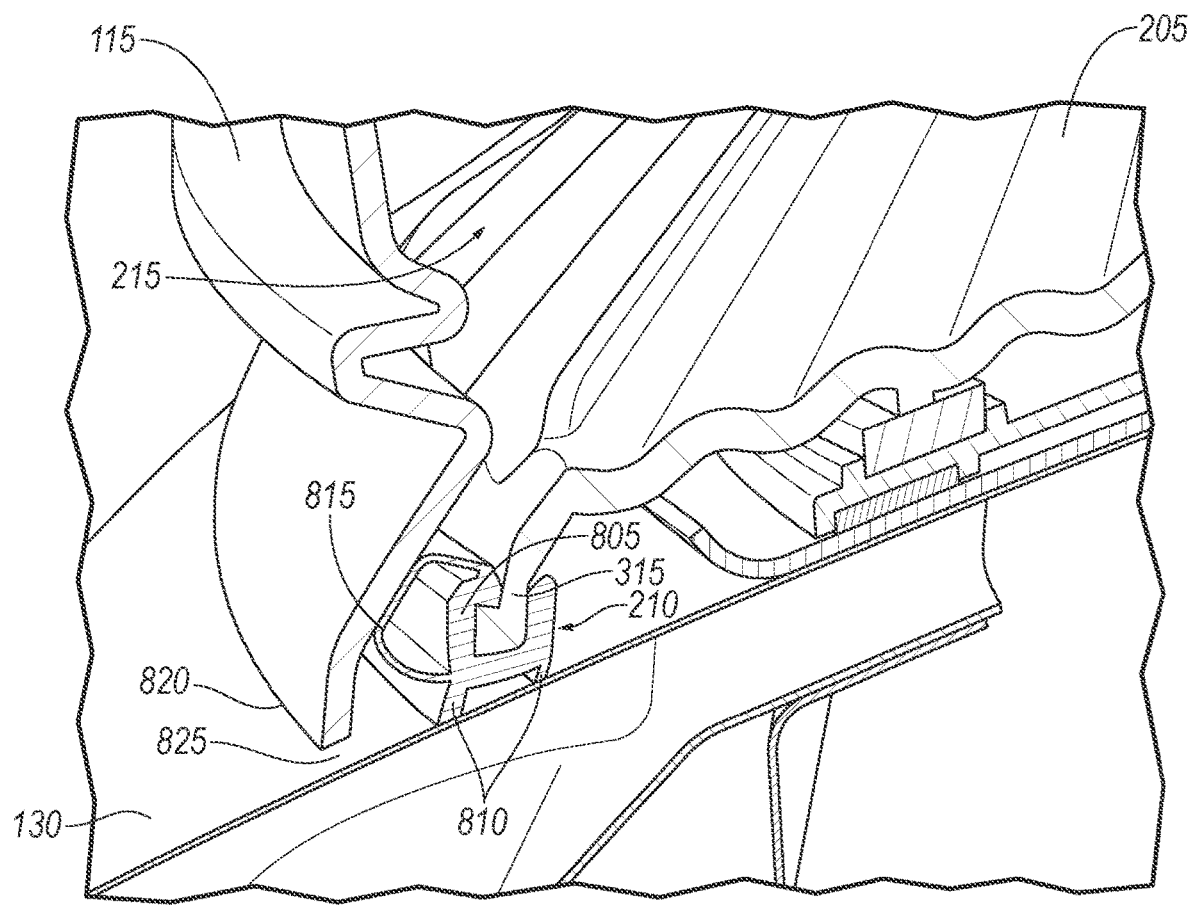
FIG. 8 is a perspective cutaway view of a portion of the sensor assembly.

With reference to FIG. 8, the seal 210 may cover the base peripheral edge 315, e.g., the uniform cross-sectional shape of the seal 210 may extend around the base peripheral edge 315 from a top side of the base 205 to a bottom side of the base 205. For example, the seal 210 may be shaped to attach to the base peripheral edge 315 with a snap fit, eliminating a need for adhesive or fasteners. The cross-sectional shape of the seal 210 may include a base portion 805 extending around the base peripheral edge 315, a roof portion 810 extending from the base portion 805 to the roof 130, and a housing portion 815 extending from the base portion 805 to the housing 115. The base portion 805 may have a C-shaped cross-sectional shape, i.e., a partial loop extending more than 180° around the base peripheral edge 315, to provide the snap fit. The roof portion 810 may include one or more ribs to absorb energy and maintain continuous contact between the base peripheral edge 315 and the roof 130. The housing portion 815 may have a semicircular shape bulging away from the base portion 805 to absorb energy between the base peripheral edge 315 and the housing 115 and maintain continuous contact with the housing 115.

The seal 210 is compressed between the base 205 and the housing 115, e.g., the base portion 805 and the housing portion 815 of the seal 210 is compressed between the base 205 and the housing 115. The base portion 805 contacts the base peripheral edge 315. The housing portion 815 contacts the housing 115 inside of a housing peripheral edge 820 and is spaced from the housing peripheral edge 820. The seal 210 is compressed between the base 205 and the vehicle body panel 125 to which the sensor assembly 105 is mounted, e.g., the roof 130. For example, the base portion 805 and the roof portion 810 of the seal 210 are compressed between the base peripheral edge 315 and the roof 130. The seal 210 thus provides energy absorption and sealing between three different components.

The housing 115 includes the housing peripheral edge 820, which is a lateral outer boundary of the housing 115, i.e., circumscribes a footprint of the housing 115. The housing peripheral edge 820 is positioned to define a gap 825 between the housing peripheral edge 820 and the vehicle body panel 125 to which the sensor assembly 105 is mounted, e.g., the roof 130. The gap 825 may permit fluid that flows through the notches 605 to flow outside of the sensor assembly 105 onto the roof 130 of the vehicle 100. The gap 825 may extend fully around the housing 115, e.g., along an entirety of the housing peripheral edge 820. The gap 825 may have a uniform height along the entirety of the housing peripheral edge 820. The housing 115 may be arranged to conceal the seal 210, thereby providing some protection to the seal 210 from the external environment. For example, the gap 825 may be narrower than a height of the uniform cross-sectional shape of the seal 210, e.g., fully around the housing 115. The gap 825 is thus sized to permit fluid to exit while concealing the seal 210.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A sensor assembly comprising:
   a base;
   a sensor mounted to the base;
   a housing mounted to the base; and
   a seal extending around the base, the seal compressed between the base and the housing;
   wherein the seal includes a notch sized to permit fluid to exit from a space enclosed by the base and the housing.

2. The sensor assembly of claim 1, wherein the notch is a gap in the seal.

3. The sensor assembly of claim 1, further comprising a vehicle body panel to which the base is mounted.

4. The sensor assembly of claim 3, wherein the seal is compressed between the base and the vehicle body panel.

5. The sensor assembly of claim 3, wherein the housing includes a housing peripheral edge, and the housing peripheral edge is positioned to define a gap between the housing peripheral edge and the vehicle body panel, the gap extending around the housing.

6. The sensor assembly of claim 1, wherein the base includes a base peripheral edge, and the seal covers the base peripheral edge.

7. The sensor assembly of claim 6, wherein the notch is located at a locally lowest point of the base peripheral edge.

8. The sensor assembly of claim 6, wherein the seal is shaped to attach to the base peripheral edge with a snap fit.

9. The sensor assembly of claim 1, wherein the housing includes a housing peripheral edge, and the seal contacts the housing inside of the housing peripheral edge and spaced from the housing peripheral edge.

10. The sensor assembly of claim 1, wherein the seal has a uniform cross-sectional shape projected along a path around the base.

11. The sensor assembly of claim 1, wherein the housing is arranged to conceal the seal.

12. The sensor assembly of claim 1, wherein the base includes a mounting platform to which the sensor is mounted, and the base is shaped to direct gravity-induced fluid flow from the mounting platform to the notch.

13. The sensor assembly of claim 12, wherein the base includes a gutter extending around the mounting platform and a channel extending downward from the gutter.

14. The sensor assembly of claim 12, wherein the base includes a depression positioned below the mounting platform, the depression includes a drain hole at a lowest point of the depression, and the drain hole is positioned to direct gravity-induced fluid flow from the depression to the notch.

15. The sensor assembly of claim 14, further comprising a hose elongated from the drain hole to a base peripheral edge of the base.

16. The sensor assembly of claim 12, wherein the mounting platform is at a highest point of the base.

17. The sensor assembly of claim 12, wherein the sensor extends upward through a port of the housing.

18. The sensor assembly of claim 1, wherein the seal includes a plurality of notches including the notch, and the notches are sized to permit fluid to exit from the space enclosed by the base and the housing.

19. The sensor assembly of claim 1, wherein the sensor is positioned in the space between the base and the housing.

20. The sensor assembly of claim 1, wherein the sensor is an optical sensor.

* * * * *